United States Patent
Haas (10) Patent No.: US 6,304,556 B1
(45) Date of Patent: Oct. 16, 2001

(54) ROUTING AND MOBILITY MANAGEMENT PROTOCOLS FOR AD-HOC NETWORKS

(75) Inventor: Zygmunt J. Haas, Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 09/138,566

(22) Filed: Aug. 24, 1998

(51) Int. Cl.[7] ........................................ H04Q 7/24

(52) U.S. Cl. ................. 370/254; 370/238; 370/351; 370/338

(58) Field of Search ...................... 370/254, 255, 370/256, 257, 258, 328, 338, 349, 351–359, 238, 216, 227, 228, 237, 229; 709/220, 221, 222, 241; 455/422, 432, 433, 435, 456

(56) References Cited

U.S. PATENT DOCUMENTS

| | | |
|---|---|---|
| 4,825,206 | 4/1989 | Brice, Jr. et al. . |
| 4,864,559 | 9/1989 | Perlman . |

(List continued on next page.)

OTHER PUBLICATIONS

M.S. Corson et al., "A Distributed Routing Algorithm for Mobile Wireless Networks," Wireless Networks, p. 61–81, (Jan., 1995).

R. Dube et al., "Signal Stability–Based Adaptive Routing (SSA) for Ad Hoc Mobile Networks," IEEE Personal Communication Magazine, (Feb. 1997).

C.L. Fullmer et al., "Floor Acquisition Multiple Access (FAMA) for Packet–Radio Networks," Proc. of ACM SIGCOMM '95, (1995).

J.J. Garcia–Luna–Aceves, "Loop–Free Routing Using Diffusing Computations," IEEE/ACM Transactions on Networking, vol. 1 (No. 1), p. 130–141, (Feb., 1993).

(List continued on next page.)

*Primary Examiner*—Ajit Patel
(74) *Attorney, Agent, or Firm*—Jones, Tullar & Cooper (57) ABSTRACT

Two network communication protocols, one for routing and one for mobility management, are presented that are particularly suited for use with ad-hoc networks. The routing protocol is a proactive-reactive hybrid routing protocol that limits the scope of the proactive procedure to the node's local neighborhood. Routing zones are defined for each node that include nodes whose distance from the subject node in hops is at most some predefined number, referred to as the zone radius. Each node is required to know the topology of the network within its routing zone only. The reactive procedure is limited during route discovery to queries of only those nodes located on the periphery of routing zones. In this manner, the queries hop across nodes in distances of zone radius, thus limiting the scope of the reactive procedure. The zone radius is preferably adjustable to accommodate different and differing network topologies and network operational conditions in the most efficient manner. The mobility management protocol relies on some network nodes assuming the mobility management function. In this scheme, each network node is "associated" with one or more mobility management nodes. The mobility management nodes form a virtual network which is embedded within the actual ad-hoc network. Each mobility management node knows the location of all nodes within its zone, and communicates this information to any other mobility management node that requests it.

23 Claims, 3 Drawing Sheets

U.S. PATENT DOCUMENTS

| | | |
|---|---|---|
| 4,912,656 | 3/1990 | Cain et al. . |
| 5,051,987 * | 9/1991 | Conlon ................................. 370/351 |
| 5,241,533 | 8/1993 | Kimoto et al. . |
| 5,297,137 | 3/1994 | Ofek et al. . |
| 5,412,654 | 5/1995 | Perkins . |
| 5,487,065 * | 1/1996 | Acampora et al. .................. 370/338 |
| 5,497,368 | 3/1996 | Reijnierse et al. . |
| 5,526,414 | 6/1996 | Bedard et al. . |
| 5,583,996 | 12/1996 | Tsuchiya . |
| 5,646,936 | 7/1997 | Shah et al. . |
| 5,652,751 | 7/1997 | Sharony . |
| 5,748,619 * | 5/1998 | Meier ................................... 370/278 |
| 6,046,978 * | 4/2000 | Melnik ................................. 370/221 |
| 6,122,258 * | 9/2000 | Brown ................................. 370/256 |

OTHER PUBLICATIONS

M. Geria et al., "Multicluster, Mobile, Multimedia Radio Network," ACM/Baltzer Wireless Networks Journal, vol. 1 (No. 3), p. 255–265, (1995).

Z.J. Haas, "A Routing Protocol for the Reconfigurable Wireless Networks," IEEE ICUPC '97, (Oct. 12–16, 1997).

D.B. Johnson et al., "Dynamic Source Routing in Ad–Hoc Wireless Networking," Mobile Computing, (1996).

P. Karn, "A New Channel Access Method for Packet Radio," ARRL/CRRL Amateur Radio 9th Computer Networking Conference, p. 134–140, (1990).

G. Lauer, "Hierarchical Routing Design for SURAN," IEEE International Conference on Communications '86, p. 93–102, (Jun. 22–25, 1986).

S. Murthy et al., "An Efficient Protocol for Wireless Networks,"Monet, vol. 1 (No. 2), p. 183–197, (Oct., 1996).

C.E. Perkins et al., "Highly Dynamic Destination–Sequenced Distance–Vector Routing (DSDV) for Mobile Computers," ACM SIGCOMM, vol. 24 (No. 4), p. 234–244, (Oct., 1994).

J. Sharony, "A Mobile Radio Network Architecture with Dynamically Changing Topology Using Virtual Subnets," Monet, vol. 1 (No. 1), p. 75–86, (1996).

* cited by examiner

ROUTING AND MOBILITY MANAGEMENT PROTOCOLS FOR AD-HOC NETWORKS

BACKGROUND OF THE INVENTION

1. Field of the Invention

The present invention relates in general to two network protocols which are particularly suitable for self-reconfigurable communications networks, such as ad-hoc networks. More particularly, the first protocol is instrumental in efficiently finding routes within a network, while the second protocol can be used to locate users in a network with rapidly changing topology.

2. Background Information and Description of the Prior Art

A. The Notion of the Ad-Hoc Network

An ad-hoc network architecture is a network that can be deployed rapidly and without relying on preexising fixed network infrastructure. The nodes in an ad-hoc network can dynamically join and leave the network, frequently, often without warning, and without disruption to other nodes' communication. Finally, the nodes in the network can be highly mobile, thus rapidly changing the node constellation and the presence or absence of links. Examples of the use of the ad-hoc networks are:

tactical operation—for fast establishment of communication infrastructure during force deployment in unknown and hostile terrain;

rescue missions—for communication in areas without adequate wireless coverage;

national security—for communication in times of national crisis, where the existing communication infrastructure is non-operational due to a natural disaster or a global war;

law enforcement—for fast establishment of communication infrastructure during law enforcement operations;

commercial use—for setting up communication in exhibitions, conferences, or sale presentations;

education—for operation of wall-free (virtual) classrooms; and sensor networks—for communication between intelligent sensors (e.g., MEMS) mounted on mobile platforms.

Nodes in an ad-hoc network exhibit nomadic behavior by freely migrating within some area, and dynamically creating and tearing down associations with other nodes. Groups of nodes that have a common goal can create formations (clusters) and migrate together, similarly to military units on missions. Nodes can communicate with each other at anytime and without restrictions, except for connectivity limitations and subject to security provisions. For example, in military applications, the network nodes can represent soldiers, trucks, tanks, planes helicopters, ships or unmanned robots.

Some of the distinctive attributes of ad-hoc networks are:

the network should be immediately deployable (and re-deployable) in unknown, arbitrary communication environments;

radio propagation conditions can differ vastly throughout the network coverage and can constantly change;

connectivity between adjacent nodes can be intermittent and sporadic, both due to the nodal mobility and due to propagation conditions; and there may not be any fixed infrastructure present; the mobile nodes are all the elements of the network.

B. The Challenges of the Ad-Hoc Networks and Previous Work

The topic of ad-hoc networking has received increased attention recently. This interest comes from two different directions—from the military and from the Internet community. Of course, as the communication and networking environment of these two "markets" is quite different, the requirements, and more important the expectations, of what this technology can accomplish are quite different as well.

The three main challenges in the design and operation of the ad-hoc networks stem from the lack of a centralized entity;

the possibility of rapid platform movements; and the fact that all communication is carried over the wireless medium.

In "regular" cellular wireless networks, there are a number of centralized entities; e.g., the base stations, the Mobile Switching Centers (MSC-s), and the Home Location Registry. In ad-hoc networks, since there is no preexisting infrastructure, these centralized entities do not exist. The centralized entities in the cellular networks perform the function of coordination. Thus, lack of these entities in the ad-hoc networks requires more sophisticated distributed algorithms to perform these functions. In particular, the traditional algorithms for mobility management, which rely on the HLR/VLR (Home Location Register/Visitor Location Register) and the medium access control schemes, including the channel assignment procedures, which rely on the base-station/MSC (Mobile Switching Center) support, cannot be used here.

All communications between all network entities are carried in ad-hoc networks over the wireless medium Of course, due to the radio communications being extremely vulnerable to propagation impairments, connectivity between network nodes is not guaranteed. In fact intermittent and sporadic connectivity may be quite common. Additionally, as the wireless bandwidth is limited, its use should be minimized. Finally, as some of the mobile devices are expected to be hand-held with limited power sources, the required transmission power should be minimized as well The last two attributes, conservation of wireless spectrum and reduction in transmission power, lead naturally to an architecture in which the transmission radius of each mobile is limited and channels assigned to mobiles are spatially reused. Consequently, since the transmission radius is much smaller than the network span, communication between two terminals may need to be relayed through intermediate nodes; i.e., multi-hop routing.

Because of the possibly rapid movement of the nodes and fast changing propagation conditions, network information, such as routing, for example, becomes quickly obsolete. This leads to frequent network reconfiguration and frequent exchanges of control information over the wireless medium. Of course, as the wireless spectrum is at premium, frequent exchanges of large amounts of data over the air should to be avoided. Moreover, because of the fast changing topology, a large portion of the reconfiguration information will never even be used. Thus, the bandwidth used for distribution of the routing update information is wasted. Finally, in spite of these attributes, the design of the ad-hoc networks still needs to allow for a high degree of reliability, survivability, availability and manageability of the network.

Based on the above discussion, the following features are considered as highly desirable for the successful operating of ad-hoc networks:

Robust routing and mobility management algorithms to increase the networks reliability, survivability and availability; i.e., any remaining network components should operate even in the case that a large portion of the network is wiped out, partitioned, or incapacitated;

Adaptive algorithms and protocols to adjust to frequently changing radio propagation, network, and traffic conditions;

Low-overhead algorithms and protocols to preserve the radio communication resource;

Multiple (distinct) routes between a source and a destination—to reduce the congestion in the vicinity of certain nodes, and to increase the reliability and survivability; and Non-hierarchical physical network architecture to avoid the susceptibility to network failures, congestion around certain nodes, and the penalty due to inefficient routing.

Routing Protocols

The routing protocols published in the literature are inadequate for the ad-hoc network communications environment. More specifically, the challenges stem from the fact that, on one hand, in-order to determine a packet route, at least the reachable information of the source's neighbors needs to be known to the source node. On the other hand, in an ad-hoc network, this topology may change quite often. Furthermore, as the number of network nodes can be large, the potential number of destinations is also large, requiring large and frequent exchange of data (e.g., routes, routes updates, or routing tables) among the network nodes. Thus, the amount of update traffic is quite high. This is in contradiction with the fact that updates are expensive in the wireless communication environment.

The existing routing protocols can be classified either as proactive or as reactive. Proactive protocols attempt to continuously evaluate the routes within the network, so that when a packet needs to be forwarded, the route is already known and can be immediately used. Reactive protocols, on the other hand, invoke a route determination procedure on demand only. Thus, when a route is needed, some sort of a global search procedure is employed.

The advantage of the proactive schemes is that, once a route is requested, there is little delay until a route is determined. In reactive protocols, because route information may not be available at the time a routing request is received, the delay to determine a route can be quite significant. Furthermore, the global search procedure of the reactive protocols requires significant control traffic. Because of this long delay and excessive control traffic, pure reactive routing protocols may not be applicable to real time communication. However, pure proactive schemes are likewise not appropriate for the ad-hoc network environment, as they continuously use a large portion of the network capacity to keep the routing information current. Since nodes in ad-hoc networks can move quite fast, and as the changes may be more frequent than the routing requests, most of this routing information is never even used! This results again in an excessive waste of the network capacity. What is needed is a protocol that, on one hand, initiates the route-determination procedure on-demand, but with limited cost of the global search.

A related issue is that of updates in the network topology. For a routing protocol to be efficient, changes in the network topology have to have local effect only. In other words, creation of a new link at one end of the network is an important local event but, most probably, not a significant piece of information at the other end of the network. Proactive protocols tend to distribute such topological changes widely in the network, incurring large costs.

Mobility Management

Traditionally, locating a user in a mobile system is performed by associating each user with a single entity in the network that keeps track at all times of the user's (sometimes approximate) location. Without restricting the discussion to a particular system, we will call this single entity a Home Location Registry (HLR). Tracking users is achieved through the registration process, in which every mobile user notifies its HLR about its current location within the network. Subsequent messages to the BIR indicating that the user had migrated into a new location are referred to as updates. The location update process can be based on different stimuli. Possible stimuli include the distance traveled by the mobile since the last update, time elapsed since the last update, or the migration of the user out of one and into another virtual area, referred to as Location Area-s (LA-s).

Location of a user can be tracked down exactly, known approximately, or not known at all In the first case, when a connection request or a message destined to the mobile arrives in the network, it can be immediately delivered to the mobile. Not so, however, in the second and the third cases, in which some amount of searching of the user is required to determine its location precisely. This searching is performed through the paging process. Paging is a process in which a query message asking the user to announce its location is broadcasted within the area of the user's location uncertainty. The queried user, on receipt of the query, sends an update message to the Variants of this mobility management scheme are currently universally used in nearly every cellular system, from the mobile phone system, such as the AMPS and through the IP Mobility Support (a.k.a. Mobile IP) protocol of the Internet Engineering Task Force (IETF). Of course, the entities in different networks have different names, but the basic functions are the same. For example, the HLR is referred to as a Home Agent in the IETF Mobile-IP protocol and as a Mobile Home Function in the Cellular Digital Packet Data networks.

This mobility management scheme is, however, inadequate for ad-hoc networks, due to the fact that there is no single entity in the network that can keep track of the user's location. In other words, if a node were to assume the HLR function, there would be no assurance that such a node would be reachable or even present at any specific time. The culprit is in the fact that the traditional mobility management scheme relies, in fact, on a centralized approach.

SUMMARY OF THE INVENTION

The present invention overcomes the drawbacks of previous network protocols through provision of two new protocols, one for routing and one for mobility management, both of which are particularly well-suited for use within ad-hoc networks. The routing protocol is a proactive-reactive hybrid routing protocol-called the Zone Routing Protocol (ZRP)- that allows efficient and fast route discovery in the ad-hoc network communication environment (i.e., large geographical network size, large number of nodes, fast nodal movement, and frequent topological changes). The routing protocol, based on the notion of Routing Zones and Route Maintenance Procedure, incurs very low overhead in route determination. It requires maintenance of a small amount of routing information in each node and the cost in wireless resources for maintaining routing information of inactive routes is thus very small. In contrast to previous proactive protocols, this protocol rapidly finds routes only when transmission is necessary. Moreover, multiple routes are maintained, so that when some of these routes become obsolete, other routes can be immediately utilized. This is especially important when the network contains a large number of very fast moving nodes, as is the case in the ad-hoc networks architecture. However, the most appealing feature of the protocol is that its behavior can be made adaptive, based on the mobility and calling patterns of the mobile users.

The zone routing protocol limits the scope of the proactive procedure to the node's local neighborhood by limiting propagation of information about network changes to the neighborhood of the change only, thus limiting the cost of topological updates. On the other hand, the global search throughout the network is done by efficiently querying selected nodes in the network, as opposed to querying all the network nodes. This is accomplished by defining routing zones for each node that include nodes whose distance from the subject node in hops is at most some predefined maximal number, referred to as the zone radius. Each node is required to know the topology of the network within its routing zone only. Thus, in spite of the fact that a network can be quite large, topology updates are only locally propagated. The reactive procedure is limited during route discovery to sending of route location queries to only some or all of those nodes that are located on the periphery of routing zone. In this manner, the queries hop across nodes in distances of one zone radius, thus liming the scope of the reactive procedure.

The zone radius is preferably adjustable to accommodate different and differing network topologies in the most efficient manner from a route discovery "cost" standpoint. The adjustment can be done, for example, based on the number of outgoing connection requests placed to a particular node. If the number is large, a larger zone radius is selected to reduce route discovery costs. On the other hand, if the number is small, the zone radius can be made correspondingly smaller to reduce the overall cost of learning the routing within the routing zone.

The present invention also includes a distributed mobility management protocol based on Mobility Reporting Centers (MRC-s) that allows efficient location of mobiles within a large network. This protocol relies on some network nodes assuming the MRC function, similar to the cluster heads in a hierarchical network, and overcomes the problems associated with centralized approaches to mobility management. In this scheme, each network node is "associated" with one or more MRC-s by being positioned within management zones corresponding to the one or more MRC-s. Furthermore, an MRC learns about nodes shin its management zone and about other "neighbor" MRC-s through a protocol similar to the zone routing protocol. The MRC nodes form a virtual network, the MRC subnet, Which is embedded within the actual network.

In this protocol, a node that needs a route to a destination consults its MRC first. The MRC obtains the location of the destination by communicating the request within the virtual MRC subnet. An MRC (or MRC(s)) that "covers" the destination node, responds to the querying MRC, which, in turn, responds to the querying node. The response is a spine route that connects the source node to the destination node through their respective MRC-s. This route can then be employed by the zone routing protocol as an aid in determining one or more optimal routes to the destination node by limiting the communication of route determination requests only to peripheral nodes that are in the general direction of the destination node.

BRIEF DESCRIPTION OF THE DRAWINGS

The features and advantages of the present invention will become apparent from the following detailed description of a preferred embodiment thereof taken in conjunction with the accompanying drawings, in which.

DETAILED DESCRIPTION OF THE PREFERRED EMBODIMENTS

The first preferred embodiment of the invention comprises a Zone Routing Protocol (ZRP) that combines proactive and reactive attributes in an adjustable manner to minimize route discovery costs in a multi-node communication network. The ZRP is based on the notion of a Routing Zone and on adaptive Route Maintenance.

Routing Zone

A routing zone is defined for each node in a network and includes the nodes whose distance in hops is at most some predefined maximal number, which is referred to here as the zone radius. Each node is required to know the topology of the network within its routing zone only. Thus, nodes are updated about topological changes only witin their routing zones. Thus, in spite of the fact that a network can be quite large, the updates are only locally propagated. Since for radius greater than one, the routing zones heavily overlap, the routing tends to be extremely robust. The routes within the network are specified as a sequence of nodes, separated by approximately the zone radius.

Figure 1:
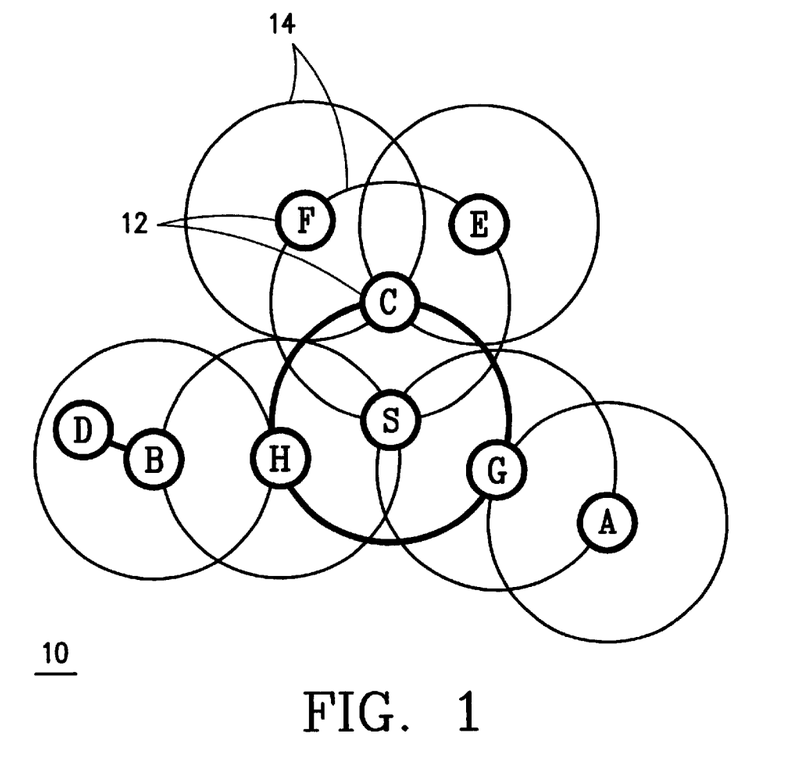
FIG. 1 is a schematic illustration of a communication network comprised of a plurality of nodes which communicate with one another in accordance with a zone routing scheme that comprises a first preferred embodiment of the present invention.
Figure 1A:
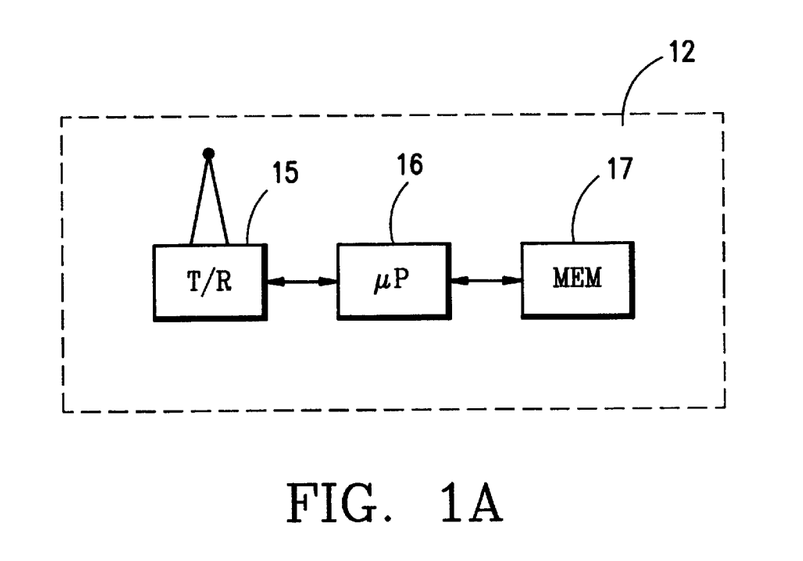
FIG. 1A is a schematic illustration of a communications node that is employed in the embodiments of the present invention.

FIG. 1 illustrates a portion of an example network 10 that includes a plurality of conventional communications nodes 12 labeled A, B, C, D, E, F, G, H and S. In this example, the routing zone for each of the nodes 12 is defined by a corresponding one of a plurality of circles 14 whose radius thus equals the routing zone radius. Thus, for example, the node S has knowledge of the location of; and routes to, each of the nodes C, G and H located on the periphery of its zone radius, as well as any other nodes (not shown) within its routing zone. FIG. 1A illustrates one of the communications nodes 12. As is conventional, the node 12 includes a transceiver 15 for transmitting and receiving communications to and from the other nodes 12 in the network 10. In addition, the node 12 includes a processor 16 for processing information requests from other nodes, managing node routing and location information, etc., in accordance with the embodiments of the invention. A memory 17 is also interfaced to the processor 16 for storing a database of node location and route information for all other nodes in the subject node's routing zone, as well as route information for other nodes outside the subject node's routing zone as discussed in further detail later.

To illustrate the operation of the Route Discovery procedure, suppose the node S is a source node that sends an information packet to node D (the destination node). To find a route within the network, S first checks whether D is within its routing zone. If so, S already knows the route to node D. If not, S sends a route location query to all of the nodes on the periphery of its zone, that is, to nodes C, G and R (This is typically accomplished by broadcasting the query, however, it may be desirable in some instances, as discussed in greater detail later in conjunction with the second embodiment of the invention, to send the query only to some of the peripheral nodes. In this case, multicasting could be employed.) Now, in turn, each one of these nodes, after verifying that D is not in its routing zone, forwards the query to its "peripheral" nodes. In particular, H sends the query to B, which recognizes D as being in its routing zone and responds to the query, indicating the forwarding path: S-H-B-D. The mechanism by which B learns about the forwarding path is by Route Accumulation. Route Accumulation is a simple protocol by which each node that forwards the query appends its identity to the query message.

The main advantage of the zone routing protocol is in the fact that the number of "flood" messages to discover a route is much smaller, as compared with other reactive-type protocols. This is so, because the route discovery queries leap between the "peripheral" nodes in quantum of the zone radius. An important aspect of the ZRP is that it discovers multiple routes to the destination. Finally, the Route Discovery process can be made much more efficient in resources, at the expense of longer latency. This could be done by sequentially, rather than simultaneously, querying the peripheral zone nodes, either one-by-one or in groups. Thus, there is a tradeoff between the cost and the latency of the Route Discovery procedure.

The Route Maintenance Procedure

Figure 2A:
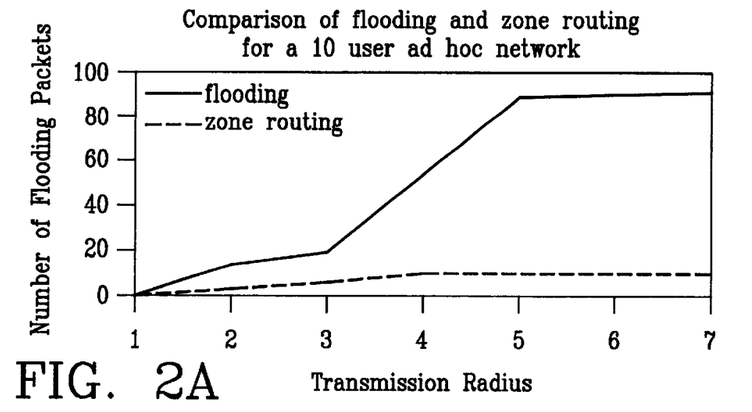
FIGS. 2A–C are graphs illustrating comparisons of flooding and zone routing communications protocols for 10, 20 and 30 user ad-hoc networks, respectively.
Figure 2B:
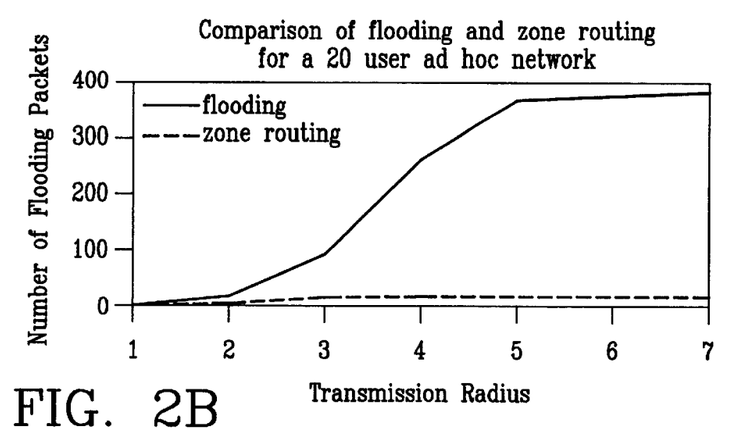
Figure 2C:
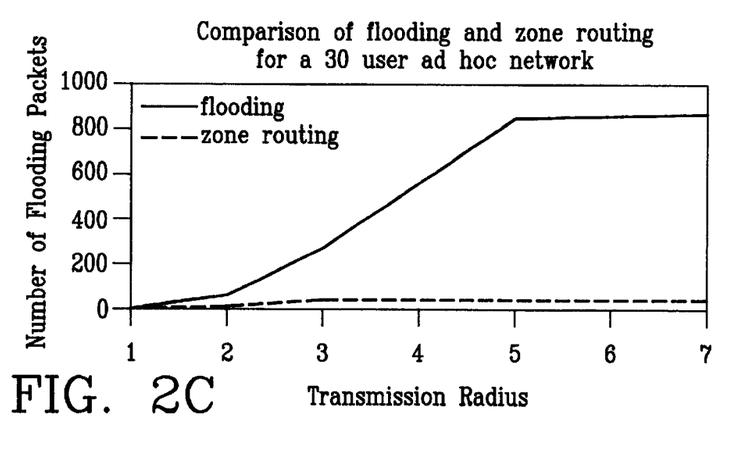

In the Route Discovery procedure, each of the nodes 12, proactively and continuously learns the topology within its zone radius and, reactively, on-demand, discovers routes by hopping in hops of routing radius. Because the number of nodes within a zone is much smaller than the total number of network nodes, the penalty for dissemination of routing information within a zone is limited. So is the cost of the route discovery, When the zone radius is sufficiently large. For a small radius (zone radius=1), the ZRP behaves as a reactive scheme (flooding). On the other extreme, for a large radius (zone radius=∞), the scheme exhibits proactive behavior. In general, the size of the routing radius determines the ratio between the proactive and the reactive behavior of the protocol The Route Maintenance Procedure adaptively adjusts the zones' radii to reduce the "cost " of the Route Discovery Procedure. FIGS. 2A–C compare the number of control messages for different network sizes (10, 20 and 30 users, respectively) for radius of 1 (the "flooding" curve) with the zone routing scheme at radius of 2 (the "zone routing" curve). The dramatic reduction in the amount of control traffic is clearly demonstrated.

The adjustment of the zone radius can be done based on the value of Call-to-Mobility-Ratio (CMR) at a particular node. Large CMR indicates that the network mobiles, i.e., nodes corresponding to mobile users, are very active in connection initiation and, thus, larger zone radius would decrease its frequent route discovery costs. Small CMR suggests that mobiles rarely place outgoing connections and, to reduce the overall cost of learning the routing in the nodes' routing zones, a smaller zone radius is preferable. Similarly, for fast moving mobiles (small CMR) the local zone routing information becomes obsolete quickly, i.e., a smaller zone radius carries smaller penalty. Thus, the CMR for the network is continually monitored, and the zone radius is adjusted proportionally smaller or larger as the CMR either gets smaller or larger.

The Route Maintenance Procedure also significantly reduces the routing costs by employing the Route Discovery procedure only when there is a substantial change in the network topology. More specifically, active routes are cached by the communicating end nodes and the intermediate nodes along the route. Inactive paths are purged from the caches after some timeout period. Upon a change in the network topology, such that a link within an active path is broken, a local path repair procedure is initiated. The path repair procedure substitutes a broken link by a mini-path between the ends of the broken link. A path update is then generated and sent to the end points of the path. Path repair procedures tend to reduce the path optimality (e.g., increase the length for shortest path routing). Thus, after some number of repairs, the path end points will initiate a new Route Discovery procedure to replace the path with a new optimal one.

Mobility Management Algorithm

The Route Discovery/Route Maintenance procedure described above is a way to locate a mobile node within an ad-hoc network. In spite of the fact that the Route Discovery protocol is efficient in the amount of control traffic, nevertheless, there is still a considerable amount of overhead associated with locating a user and determining a route. A second embodiment of the invention comprises a mobility management scheme that can be employed to reduce the amount of overhead associated with the Route Discovery protocol. Traditional mobility management schemes rely on an association of mobiles with a database maintained within the fixed portion of the network. Of course, in ad-hoc networks, there is neither a "fixed" portion, nor a central point in which such a database could be kept. Thus, a different approach is required.

Figure 3:
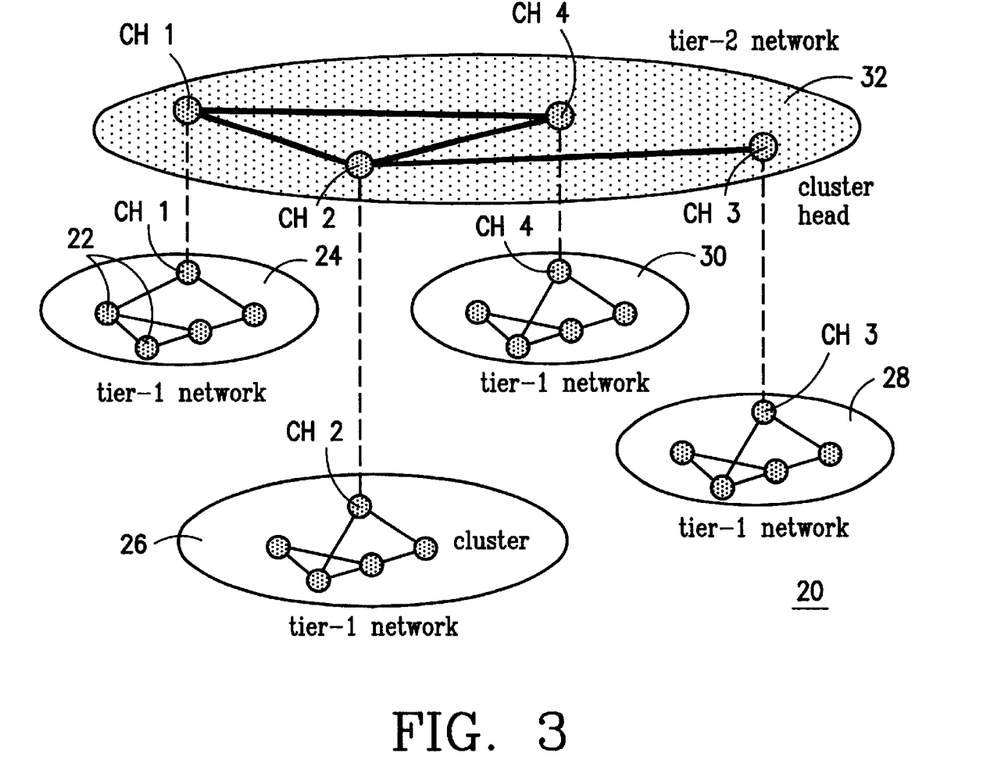
FIG. 3 is a schematic illustration of a two-tier ad-hoc network which is employed to demonstrate the operation of a mobility management scheme that forms a second embodiment of the present invention.

To explain the approach of the subject invention, the routing in a multitier ad-hoc network will be described with reference to the example shown in FIG. 3. A two-tier ad-hoc network 20 is illustrated that is comprised of a plurality of network nodes 22 that are partitioned into four clusters 24, 26, 28 and 30, each of which forms a corresponding tier-1 network. In each cluster, one node labeled CH1, CH2, CH3 and CH4, respectively, is chosen to be a cluster head. The cluster heads thus form a tier-2 network 32. Note that the tier-1 and the tier-2 networks are separate. Routing between nodes that belong to the same tier-1 network is either peer-to-peer or through the cluster head. Each cluster head "knows" the identities of all the nodes in its cluster and the routes between the cluster head and the cluster node. A route between two nodes that belong to two different tier-1 networks is determined by the cluster head of the source node through querying the other cluster heads about the location of the destination. This querying is performed within the tier-2 network. The routing is then as follows: source node to its cluster head, source cluster head to destination cluster head, destination cluster head to the destination node. The first and the third segments are within tier-1 networks. The second segment is within the tier-2 network. The advantage of a multi-tier ad-hoc network is in the relatively efficient way that the routes are determined by the cluster heads. The disadvantage of the multi-tier approach is in increased congestion at the cluster head nodes, reduced system reliability due to a single point of failure, and in sub-optimality of routing paths.

The second embodiment of the present invention comprises a distributed mobility management scheme for (flatrouted) ad-hoc networks that mimics the efficient route discovery in multi-tier ad-hoc networks. The scheme is based on certain nodes in the network assuming the mobility management function. These nodes are referred to here as Mobility Reporting Centers (MRC-s). In this scheme, each MRC includes a management zone defined by a predefined maximal radius in the same manner that the routing zones are defined in the zone routing protocol Each network node is thus "associated" with one or more MRC-s by being located within their management zones. Furthermore, an MRC learns about nodes within its management zone and about other "neighbor" MRC-s through a protocol similar to the zone routing protocol described above. The MRC nodes form a virtual network, the MRC subnet, which is embedded within the actual ad-hoc network. Note that the MRC management zones can be different than the regular routing zones of the nodes. In particular, the zone radii for the two are preferably different.

Figure 4:
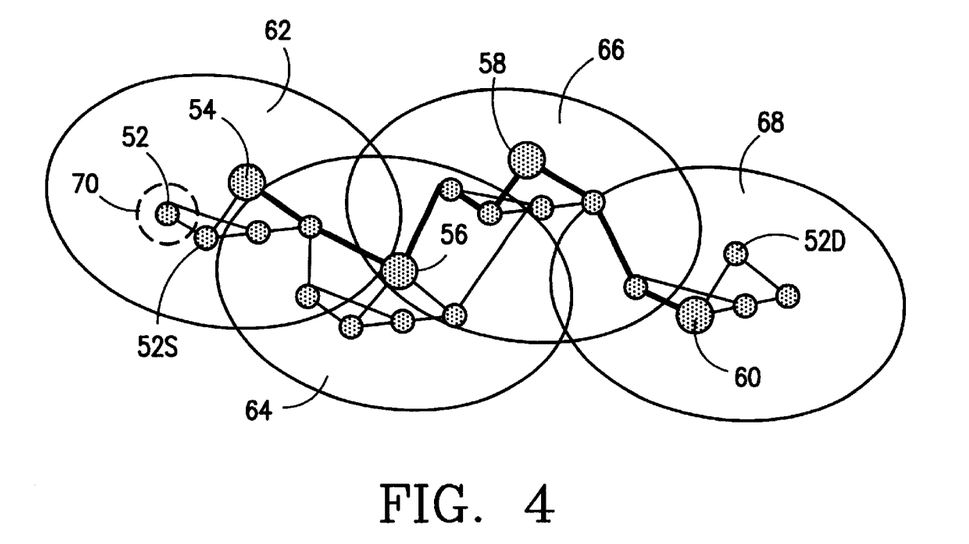
FIG. 4 is a schematic illustration of a single tier (flat) ad-hoc network which employs mobility reporting centers (MRC-s) in accordance with the second preferred embodiment of the present invention.

FIG. 4 illustrates the foregoing concept. A multi-node network 50 is shown which includes a plurality of communications nodes 52. In this example, several of the nodes 52 are selected as MRC-s 54, 56, 58 and 60, each of which is assigned to a respective one of a plurality of management zones 62, 64, 66 and 68 (note that the zones may overlap as illustrated). In this example, each of the MRC-s 54–60 continuously gathers identification and location information for all users/nodes presently located within their respective management zones 62–68. In addition, the remaining nodes 52 contain information about al other nodes in their respective routing zones 70 in accordance with the first embodiment of the invention, the Zone Routing Protocol.

The operation of the mobility management protocol is thus as follows. If one of the nodes 52S needs a route to a destination node 52D, the node 52S consults its MRC 54 first. The MRC 54 obtains the location of the destination node 52D by sending the request within the virtual MRC subnet to the other MRC-s 56, 58 and 60. The MRC (or MRC-s in the case of overlap) that "cover(s)" the destination node 52D, in this instance, MRC 60, responds to the querying MRC 54, which, in nun, responds to the querying node 52S. The response is a spine route that consists of three segments: Source node 52S to source MRC 54; source MRC 54 to destination MRC 60; and MRC 60 to the destination node 52D. In principle, the "spine route" could be used as a legitimate route. However, it may not be "optimal." Furthermore, use of spine routes creates points of congestion around the MRC-s and, thus, should be avoided. A spine route can serve, however, as a basis for constructing actual routes. More specifically, the spine route allows one to limit the Route Discovery Procedure in the Zone Routing Protocol(ZRP), described above. In other words, querying of the peripheral nodes will be restricted to only those peripheral nodes that are in the "direction" of the spine route, as opposed to proceeding in all directions. Thus, the mobility management protocol is used first to locate the destination node and the spine route thereto, after which the ZRP is used in combination with the spine route to locate one or more optimal routes from the source node to the destination node. Note that using the spine route, the number of control messages is drastically reduced. The results of a study of the MRC-based mobility management show significant improvement in the latency of the route discovery mechanism and the volume of control traffic.

In conclusion, the present invention provides two protocols, both of which can be used in ad-hoc and other self-reconfigurable networks to locate network users, and routes to the users, in an efficient manner. Although the present invention has been disclosed in terms of a pair of preferred embodiments and variations thereon, it will be understood that other variations and modifications could be made thereto without departing from the scope of the invention as defined in the following claims. For example, although the inventive protocols are particularly suited for use in self-reconfigurable networks, it should be understood that the protocols may be employed in other types of multi-node network as well.

What is claimed is:

1. A method for locating a route in a communications network comprising the steps of:

a) providing a network comprised of a plurality of communications nodes;

b) defining a routing zone for each node, each said routing zone including all nodes in said network that are within a predefined maximum distance from a corresponding node;

c) providing each node in said network with routing information for all nodes win said network that are within each node's corresponding routing zone;

d) determining from said routing information whether a destination node is located within a same routing zone as a source node in said network, and if so, determining a route from said source node to said destination node from said information;

e) if said destination node is not located within the same routing zone as said source node, then sending a route location query from said source node to at least one peripheral node on a periphery of said source node's routing zone;

f) in response to said route location query, determining whether said destination node is located within a routing zone corresponding to said at least one peripheral node, and if so, g) determining at least one route from said source node through said at least one peripheral node to said destination node;

h) if said destination node is not located within said at least one peripheral node's routing zone, then sending a route location query from said at least one peripheral node to at least one node on a periphery of said at least one peripheral node's routing zone; and i) repeating steps f–h as necessary to locate at least one route from said source node to said destination node.

2. The method of claim 1, further comprising the steps of monitoring the communication activity level for each node in at least one of said routing zones of said network, and adjusting the size of said at least one of said routing zones in response to changes in the monitored activity level.

3. The method of claim 2, wherein said network is a wireless network, said activity comprises the number of connections initiated by each node in a routing zone, and the size of said routing zone is increased or decreased in response to increase or decreases, respectively, in said number of initiated connections.

4. The method of claim 1, further comprising the steps of storing routing information for a route between said source node and said destination node in each node along said route, and deleting said routing information if said route is not requested again within a predetermined amount of time.

5. The method of claim 1, further comprising the steps of detecting whether a link between two nodes in a route has been broken due to a topology change in said network, and initiating a local repair procedure to locate a replacement path between said two nodes.

6. The method of claim 5, further comprising the steps of monitoring the number of local repairs initiated for a route, and initiating a new route location procedure after a predetermined number of repairs have been initiated to locate a new replacement route for said route.

7. The method of claim 1, wherein multiple routes are located between said source node and said destination node by sending route location queries to multiple peripheral nodes on the periphery of said source node's routing zone.

8. The method of claim 7, wherein said route location queries are sent to said multiple peripheral nodes sequentially.

9. A method for locating a route in a communications network comprising the steps of:
   a) providing a network comprised of a plurality of communications nodes;
   b) designating a subset of said nodes as a plurality of mobility management nodes;
   c) defining a management zone for each said mobility management node, each said management zone including all nodes in said network that are within a first predefined maximal distance from a corresponding mobility management node;
   d) providing each mobility management node in said network with location information for all nodes that are within each mobility management node's corresponding management zone;
   e) defining a routing zone for each node in said network, each said routing zone including all nodes in said network that are within a second predefined maximal distance from a corresponding node;
   f) providing each node in said network with routing information for all nodes within said network that are within each node's corresponding routing zone;
   g) sending a route determination request from a source node in said network to a first of said mobility management nodes having a management zone in which said source node is located;
   h) sending said request from said first mobility management node to a plurality of the remaining mobility management nodes in said network, including at least a second mobility management node having a management zone that covers a destination node identified in said route determination request;
   i) sending location information for said destination node from said second mobility management node to said first mobility management node;
   j) determining a general direction from said source node to said destination node through use of said location information sent by said second mobility management node;
   k) sending a route location query from said source node to at least one peripheral node on a periphery of said source node's routing zone that is in said general direction of said destination node;
   l) determining whether said destination node is located within a routing zone corresponding to any of said peripheral nodes, and if so, determining at least one route from said source node through said at least one peripheral node to said destination node;
   m) if said destination node is not located within said at least one peripheral node's routing zones, then sending a route location query from said at least one peripheral node to at least one node that is on a periphery of said at least one peripheral node's routing zone, and is in said general direction of said destination node; and
   n) repeating steps l and m as necessary to locate at least one route from said source node to said destination node.

10. The method of claim 9, wherein said first predefined maximal distance is greater than said second predefined maximal distance.

11. A multiple node communications network comprising:
   a) a plurality of communications nodes for transmitting and receiving information;
   b) means in a first node for storing routing information for all of said nodes that are within a routing zone of said first node, said routing zone being defined by a radius of a first predefined maximal distance from said first node;
   c) means in said first node for receiving a query from a source node outside said first node's routing zone for a route determination to a destination node; and
   d) means responsive to said query for sending route information to said source node if said destination node is in said first node's routing zone, and sending a route location query to at least one node on a periphery of said first node's routing zone, if said destination node is not in said first node's routing zone.

12. The communications network of clam 11, wherein said first node further comprises means for monitoring the communication activity level for said first node's routing zone, and adjusting the size of said routing zone in response to changes in the monitored activity level.

13. The communications network of claim 12, wherein said network is a wireless network, said activity comprises the number of connections initiated by each node in said first node's routing zone, and the size of said routing zone is increased or decreased in response to increase or decreases, respectively, in said number of initiated connections.

14. The communications network of claim 11, wherein said means for storing further includes means for storing route information for previously requested routes that have been received by said first node.

15. The communications network of claim 13, further including means for deleting route information from said storing means if said first node does not receive a request for said route information within a predetermined amount of time.

16. The communications network of claim 11, further comprising means for detecting whether a link between two nodes in a route has been broken due to a topology change in said network, and initiating a local repair procedure to locate a replacement path between said two nodes.

17. The communications network of claim 16, further comprising means for monitoring the number of local repairs initiated for a route, and initiating a new route location procedure after a predetermined number of repairs have been initiated to locate a new replacement route for said route.

18. The communications network of claim 11, wherein a plurality of said nodes are designated as mobility management nodes, and each of said mobility management nodes includes:
   1) a management zone that includes all nodes in said network that are within a second predefined maximal distance from said mobility management node;
   2) means for storing location information for all nodes that are within said mobility management node's corresponding management routing zone;
   3) means for receiving node location requests from nodes located in said mobility management zone, and from other of said mobility management nodes;

4) means for sending route determination requests to other mobility management nodes in said network in response to route determination requests received from nodes located within said management zone; and 5) means for sending node location information for a destination node located in said management zone to other of said mobility management nodes requesting the location of said destination node.

19. The communications network of claim 18, wherein said second predefined maximal distance is greater than said first predefined maximal distance, whereby said management zones are larger than said first node's routing zone.

20. The communications network of claim 19, wherein a plurality of said mobility management nodes have management zones which overlap one another.

21. The communications network of claim 11, wherein each of a plurality of said nodes includes:

1) means for storing location information for all of said nodes that are within a routing zone of said node, said routing zone being defined by a radius of said first predefined maximal distance from said node;

2) means for receiving a query from a source node outside said node's routing zone for a route determination to a destination node; and 3) means responsive to said query for sending route information to said source node if said destination node is m said node's routing zone, and sending a route location query to at least one node on a periphery of said node's routing zone, if said destination node is not in said node's routing zone.

22. The communications network of claim 21, wherein said means for sending a route location query to at least one node on a periphery of said node's routing zone further comprises means for sending route location queries to a plurality of nodes on said periphery of said node's routing zone to locate multiple routes between said source node and said destination node.

23. The communications network of clam 22, wherein said means for sending route location queries to a plurality of nodes further comprises means for sequentially sending said queries to said plurality of peripheral nodes.

* * * * *